P. S. ERIKSON.
BEARING.
APPLICATION FILED MAY 15, 1919.

1,397,948.

Patented Nov. 22, 1921.

Witnesses:
W. F. Kilroy
Harry R. L. White

Inventor:
Peter S. Erikson
By Brown, Boettcher & Dienner
Attys.

UNITED STATES PATENT OFFICE.

PETER S. ERIKSON, OF CHICAGO, ILLINOIS, ASSIGNOR TO BROWN PORTABLE CONVEYING MACHINERY COMPANY, OF CHICAGO, ILLINOIS, A CORPORATION OF ILLINOIS.

BEARING.

1,397,948.  Specification of Letters Patent.  Patented Nov. 22, 1921.

Application filed May 15, 1919. Serial No. 297,360.

*To all whom it may concern:*

Be it known that I, PETER S. ERIKSON, a citizen of the United States, residing at Chicago, in the county of Cook and State of Illinois, have invented a certain new and useful Improvement in Bearings, of which the following is a full, clear, concise, and exact description, reference being had to the accompanying drawings, forming a part of this specification.

My invention relates to improvements in bearings, and has special reference to improvements in self-adjusting or alining bearings for shafts.

My invention is particularly adapted for use in connection with the supporting shafts for endless apron conveyers and particularly adjustable conveyer shafts which carry adjustable delivery rollers of the kind described and claimed in the copending application of Lawrence V. Fraley, filed April 12, 1919, Serial Number 289,685, entitled Takeup and adjustable roller.

In adjusting the supporting shaft for endless conveyers, especially when such shaft is mounted in adjustable bearings at the outer or free end of a swinging structure or arm, it has been found difficult to maintain the two bearings at the ends of the shaft in accurate and true alinement. Even though the bearings are carefully alined they seldom remain in alinement for any length of time in use, as the frame work upon which they are carried is not sufficiently rigid. The consequence of this is that frequently the bearings or shaft are badly worn or the excessive friction causes loss of power, or even stops the operation of the conveyer.

By means of my invention, I am enabled to provide a self-alining bearing comprising a minimum number of parts, which can be constructed at a minimum cost, which can be easily assembled and taken apart, and which provide suitable supports for the arms carrying the adjustable roller.

My invention consists essentially in a spherical socket member and a spherical bearing member, each consisting of a single casting or piece and so constructed that I can readily insert the ball within the socket and obtain all the practical benefits of the usual two-piece socket for self-alining bearings.

Figure 1:
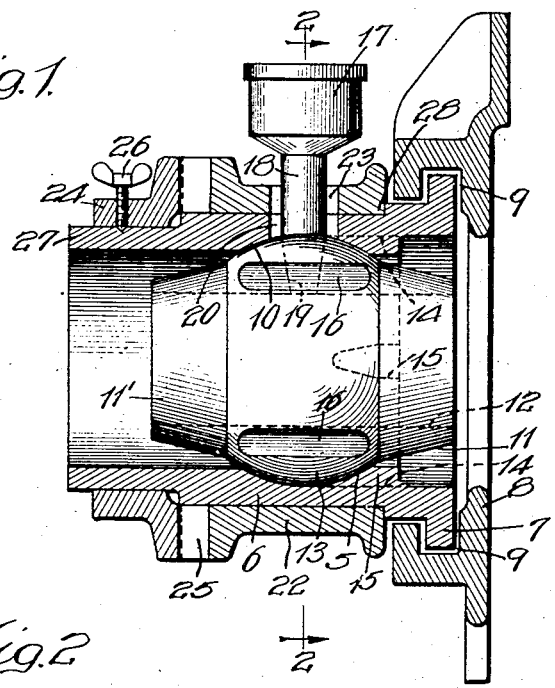
Figure 2:
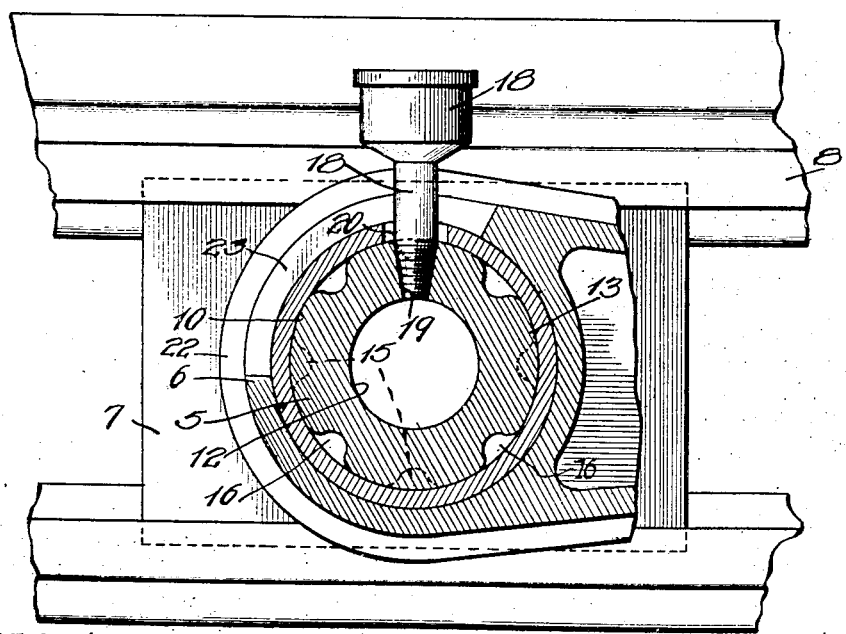

For a complete understanding of my invention, attention is directed to said drawings, in which:

Figure 1 is a central longitudinal section of the bearing, the ball being shown in elevation; and Fig. 2 is a transverse sectional view of the bearing on the line 2—2 of Fig. 1.

The bearing, as constructed for use in connection with a belt conveyer, comprises a main bearing member 5 having a cylindrical bearing portion 6 and a base flange 7. The flange 7 adapts the bearing to be adjustably mounted on a frame member 8, which is provided with longitudinal grooves 9 to receive the upper and lower edges of the base flange 7. The cylindrical bearing or sleeve part 6 projects beyond the frame 8 and is made cylindrical on its outer surface to provide a support for the base of the arm which is arranged to carry the adjustable roller disclosed in said copending application.

The bearing member 5 is relatively stationary except that it is adjustable on the frame 8 for the purpose of taking up the slack in the conveyer belt or apron, with which it is adapted to be used. I provide this member with an internal spherical bearing surface 10 which forms the socket, and I provide an inner bearing sleeve member 11, preferably formed of phosphor bronze or other suitable bearing metal, and having a central cylindrical bore 12 to receive the shaft which the bearing is adapted to support. This inner sleeve member has a central spherical enlargement 13, which fits within the spherical seat 10 in the member 5, and can accommodate itself in said spherical seat to cause the bore 12 to properly aline with the shaft mounted therein. It will be understood that in practice at least two of the complete bearings are used to support the shaft.

While I find it advantageous, on account of cost, to make the bearing member 5 of a single piece of metal, it is obvious that it could be made of more than one piece without departing from the spirit of my invention.

In order to be able to insert the ball member within the socket member, and retain the ball member in place until it is intentionally removed, I cut away the inner end of the socket member 5, as indicated by the dotted lines 14, Fig. 1, thus providing a cylindrical opening to the socket 10 of substantially maximum diameter, and through which the ball 13 can be entered into the socket from its inner end. I do not completely remove the spherical bearing surface at the inner end of the socket member, but I leave a number of relatively narrow portions 15, preferably four of these equally circumferentially spaced and adapted, as best shown in Fig. 1, to provide a bearing surface at the inner end of the bearing. The portions 15 which are thus left constitute abutments to prevent the removal of the ball member, once it has been inserted.

To permit the ball member 13 to be entered into the socket, and pass said shoulders or abutments 15, I provide the outer surface of the ball member with longitudinal flutes 16 circumferentially spaced the same as the shoulders 15, so that they can be caused to register to permit the ball to slide into the socket from the inner end, the shoulders 15 at such time passing through the several flutes 16.

After the ball has been inserted to its proper bearing position, I then rotate it through substantially 45 degrees to circumferentially separate the flutes 16 from the abutments 15, and thus lock the ball within the socket.

To prevent the bearing member 5 rotating so that the abutments 15 can be brought into registry with the flutes 16, I provide a grease cup 17 having a stem 18 which I screw into a threaded opening 19 in the member 5, and which stem passes through an opening 20 which I provide in the cylindrical shell of the socket member 5. The opening 20 is large enough to permit the ball member to adjust itself within the socket to any practical extent required by the lack of alinement of the bearing member 5 with the shaft, but is not large enough to permit the ball to rotate to such an extent as to cause the flutes 16 to register with the abutments 15.

I make the spherical bearing surface on the ball longitudinally greater in extent than the longitudinal extent of the socket to permit the ball to oscillate with the socket to follow the shaft, and I make the outer and inner ends 11' of the ball member 11 tapered sufficiently so as to provide ample clearance between the ends of the member 11 and the cylindrical bore of the member 5 to permit the member 11 to swing in the socket freely to follow the shaft which it carries.

The hub portion 22 of the arm which is mounted on the cylindrical portion 6 of the bearing member 5 is provided with a circumferentially extending slot or opening 23 through which the stem 18 of the grease cup also extends and which permits the circumferential adjustment of the hub 22 on the bearing member 5. This hub is adapted to be held in its adjusted position, as described in said copending application, viz., by means of a collar 24 which is mounted on the outer end of the bearing member 5 and held against rotation thereon, and which is provided on its inner end with radial teeth 25 adapted to engage between similar teeth provided on the outer end of said hub. The collar 24 is held longitudinally on the member 5 with the radial teeth in engagement by means of a set screw 26, and may be adapted to be held on the member 6 against rotation by being provided with a central square opening, the member 6 having its outer end 27 squared and fitting within same, or by means of some other suitable circumferential lock. The inner end of the bearing member 5 is provided with a circumferential shoulder 28 against which the inner end of the hub member 22 contacts and which holds the hub member 22 out of contact with the adjacent face of the frame 8.

When it is necessary to remove the ball member 11 from the socket, this can very readily be done by first unscrewing and removing the grease cup, after which the ball member can be rotated to cause the registry of the flutes 16 with the abutment 15 and then the member 11 can be withdrawn longitudinally from the socket member.

I claim:

1. In combination, a ball member having a cylindrical bearing for a shaft therein, a socket member having a spherical seat for holding the ball member, said members having portions cut away to permit the ball to be introduced into the socket and rotated in the socket, said socket member having integral portions which engage on opposite sides of the maximum diameter of the ball member.

2. In combination, an integral socket member having a spherical seat, an integral ball member adapted to fit said seat, said members having portions cut away to permit the ball to be introduced into the socket, and means for holding the cut away portions out of register after the ball is seated in the socket.

3. A ball and socket bearing comprising a stationary socket and an integral ball, said socket having spaced spherical shoulders at one end thereof alternating with cut out portions providing openings to admit the ball, the ball being provided with flutes in its outer surface adapted to register with the shoulders, said ball having a diametrical bore forming a bearing for a shaft.

4. A ball and socket bearing comprising an integral socket and an integral ball, said socket having spaced spherical shoulders at one end thereof alternating with cut out portions providing openings to admit the ball, the ball being provided with flutes in its outer surface adapted to register with the shoulders and means for normally retaining the ball within the socket with its flutes out of register with said shoulders.

5. In a ball and socket bearing, an inner ball member having a central opening to receive a shaft, an outer socket member fitting upon said ball member, the socket member being formed at one end with circumferentially spaced shoulders alternating with cut out portions in the shoulders preserving on their inner surfaces the spherical inner surface of the socket member, the ball provided with coöperating flutes in its outer surface adapted to register with said shoulders to permit the ball to enter the socket.

6. A shaft bearing comprising an outer integral socket member, an inner integral ball member having a central opening for a shaft, and fitting within the socket member, said socket member cut away at one end to permit the entrance of the ball member and provided with circumferentially spaced uncut portions, the ball member having similarly spaced longitudinal flutes in its outer surface adapted to register with said uncut portions to permit the ball to enter the socket, and means for retaining the ball member rotated within the socket member to a position where the flutes are not in register with said uncut portions.

7. A ball and socket bearing comprising an integral socket and an integral ball, said socket having spaced spherical bearing shoulders at one end thereof, the ball being provided with flutes in its outer surface adapted to register with said shoulders and permit the ball to be entered and removed, a grease cup having a shank threaded into the ball, the socket member having an opening through which said shank freely passes and permitting relative movement of the ball within the socket to a limited extent.

8. In a ball and socket bearing, a ball member adapted to have a shaft journaled therein, a socket member adapted to receive said ball member, one end of the socket member having a plurality of cut away portions forming shoulders therebetween, flutes on said ball member for registering with the shoulder to permit removal of the ball member from the socket member, said ball being rotatable in the socket member.

9. In combination, a stationary socket member having a spherical seat, a bearing member for a shaft having a spherical portion adapted to be engaged on diametrically opposite sides of its center by the seat, whereby the bearing member is adapted to lock in said seat, and a pin member projecting through the seat into the bearing member to prevent rotation of the bearing in the seat.

10. In combination, a cast metal socket member, a cast metal ball member, said members having grooves on one member and lands on the other member to permit the introduction of the ball into the socket, said ball adapted to be locked in the socket by turning thereof, and a pin rigidly secured in the ball member for preventing the lands and grooves from coming into register after the members are assembled.

11. In a conveyer, a frame, a traveling conveyer on the frame, guides at the sides of the frame, bearing members carried by said guides, said bearing members having ball and socket joint therein, a ball in each socket and a shaft having a bearing in the ball, said shaft serving to support the traveling conveyer.

12. In combination, a conveyer frame having a guide at one end thereof, a sliding bearing on said guide, said sliding bearing having a ball and socket joint therein, the ball member having a cylindrical bearing for a shaft.

13. In combination, a conveyer arm having guides on opposite sides at one end thereof, adjustable bearing frames in said guides, said adjustable bearing frames having spherical socket members, each having a spherical surface for holding a ball member, ball members coöperating with said sockets, said ball members having diametrical bores forming bearings for a shaft, and radius arms journaled externally on said adjustable bearing frame for holding a delivery roller in any desired position at the end of the conveyer.

14. In combination, a conveyer arm having guides at one end thereof, bearing members slidable in said guides, ball members having a diametrical bore forming bearings for a shaft, said bearing members having sockets for said ball members, adjustable arms journaled on said bearing members for holding a delivery roller at said end of the conveyer arm, said adjustable arms having slots therein, and means passing through said slots for locking said balls in said sockets.

15. In a bearing, an integral cast metal socket member having a spherical seat, an integral cast metal ball having spherical surfaces closely fitting said seat, said ball having a diametrical bore forming a bearing for a shaft, said cast metal ball being locked from longitudinal displacement in said seat by rotation of the ball in the seat.

16. In a bearing, an integral cast metal socket member having a spherical seat, an integral cast metal ball having spherical surfaces closely fitting said seat, said ball having a diametrical bore forming a bearing for a shaft, said socket and said ball having alined openings for the introduction of a lubricant, and means adapted to introduce lubricant through said alined openings.

17. In a bearing, an integral cast metal socket member having a spherical seat, an integral cast metal ball having spherical surfaces closely fitting said seat, said ball having a diametrical bore forming a bearing for a shaft, and a pipe for lubricant passing loosely through said socket and secured in the ball member.

18. In a bearing member, a hollow cylindrical sleeve member forming a cage, said sleeve member having an internal spherical groove formed about the inner periphery, longitudinal grooves being formed between the bottom of said spherical groove and one end of the sleeve, a bearing member having a central spherical portion and tapered end portions with a longitudinal bore therethrough forming a bearing for a shaft, said central spherical portion having grooves cut therein to correspond with the solid portions left between the longitudinal grooves in the sleeve member whereby turning after insertion will lock said spherical portion in said sleeve member.

In witness whereof, I hereunto subscribe my name, this 7th day of May, 1919.

PETER S. ERIKSON.